K. L. BURRILL.
FLOAT VALVE.
APPLICATION FILED FEB. 11, 1919.

1,323,960.

Patented Dec. 2, 1919.

Inventor
Kenneth L. Burrill
By Victor J. Evans
Attorney

UNITED STATES PATENT OFFICE.

KENNETH L. BURRILL, OF NEW GLASGOW, NOVA SCOTIA, CANADA.

FLOAT-VALVE.

1,323,960.

Specification of Letters Patent.  Patented Dec. 2, 1919.

Application filed February 11, 1919. Serial No. 276,414.

*To all whom it may concern:*

Be it known that I, KENNETH L. BURRILL, a subject of the King of Great Britain, residing at New Glasgow, in the Province of Nova Scotia and Dominion of Canada, have invented new and useful Improvements in Float-Valves, of which the following is a specification.

This invention relates to valves, particularly to those of the float actuated type, and has for its object the provision of a float valve adapted for use in cutting off the flow of water into a receptacle such as, for instance, a flushing tank, the construction of the valve being such as to eliminate the necessity of washers or other packing.

An important object is the provision of a float valve of this character having associated therewith a cut off valve so connected with the float valve structure that the float valve may be bodily removed from the tank or other receptacle without disturbing any of the associated parts.

A further object is the provision of a valve of this character which will be extremely simple and inexpensive in manufacture, highly efficient in use, durable in service and a general improvement of the art.

With the above and other objects and advantages in view, the invention consists in the details of construction to be hereinafter more fully described and claimed and illustrated in the accompanying drawing in which:—

Figure 1:
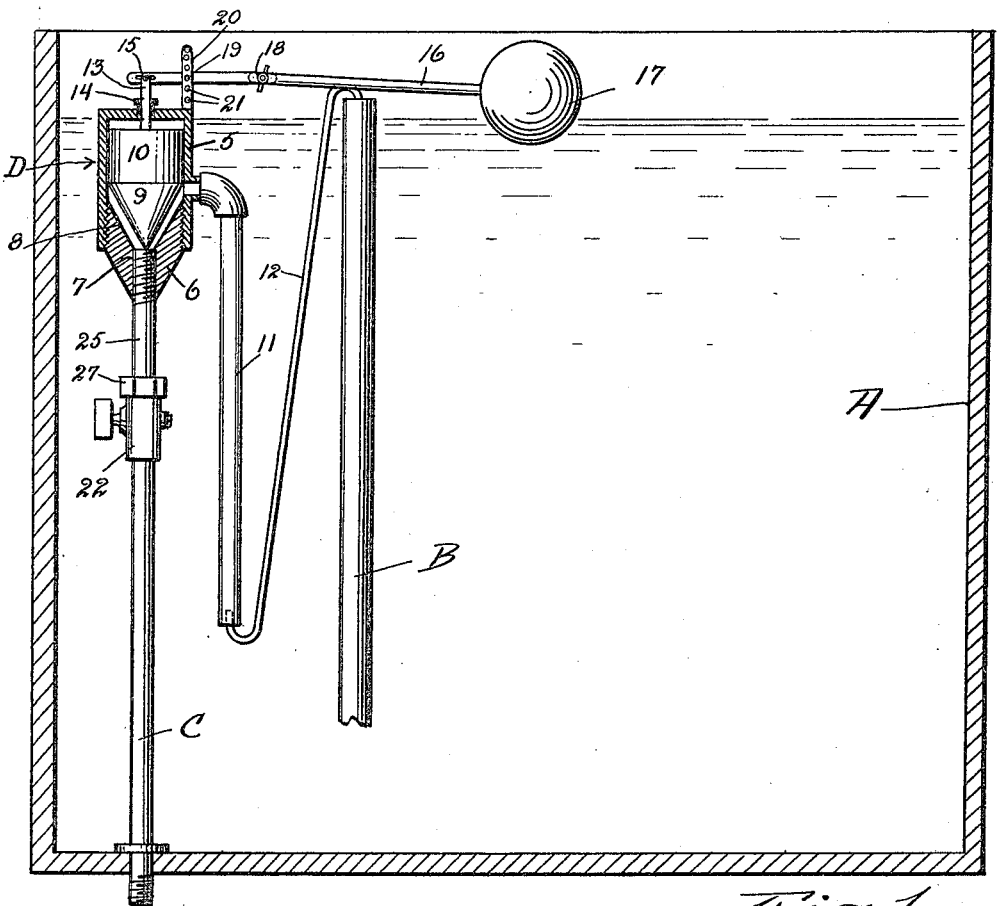
Figure 2:
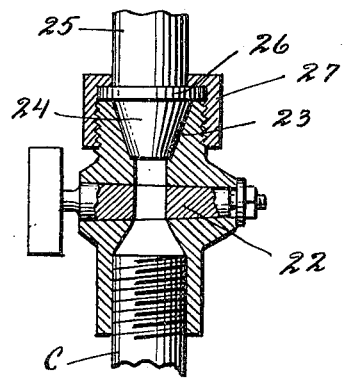

Figure 1 is a longitudinal sectional view showing the valve associated with a tank, and Fig. 2 is a detail sectional view showing the float valve body disconnected from the cut off valve.

Referring more particularly to the drawing, the letter A designates a portion of a tank which is provided with the usual refill pipe B, and into which extends the usual inlet pipe C. The letter D designates my improved float valve as a whole which comprises a cylindrical shell 5 internally threaded at its lower end for engagement therewithin of a plug 6 provided with a central bore 7 communicating with an inverted frusto-conical recess 8 in the upper face of the plug. This recess 8 is ground so as to form a valve seat engageable by the correspondingly shaped inverted conical lower end 9 of a valve 10 slidably disposed within the shell 5. The valve 10 is formed comparatively heavy so that it will seat effectively within the recess 8. A vertically disposed pipe 11 is arranged within the tank A and has its upper end communicating with the interior of the shell 5 above the top of the plug 6. Extending into the lower end of the pipe 11 is the lower end of an upwardly extending tube 12 which has its upper end discharging into the refill pipe B to provide the usual after flush.

In order that the position of the valve 10 may be controlled by the level of the water within the tank A, I provide a stem 13 extending upwardly from the top of the valve 10 and arranged through a suitable stuffing box 14 in the top of the shell 5. Pivotally connected with the upper end of the stem 13, as shown at 15, is one end of a float arm 16 which carries at its outer end a float 17 of ordinary construction. The rod 16 is provided intermediate its ends with an adjusting joint 18 and is pivoted at 19 upon an upstanding bracket 20 secured to the side of the shell 5. The bracket 20 is provided with a plurality of holes 21 engageable selectively by a cotter pin or the like which passes through the float arm 16 whereby the fulcrum of the float arm may be adjusted.

Threaded upon the upper end of the inlet pipe C is a cut off valve 22 which has its upper end provided with a recess 23 within which is disposed the tapered end 24 of a pipe 25 which has its upper end threaded into the bore 7 of the plug 6. The pipe 25 is provided adjacent its lower end with a flange 26 engaged by a flanged union 27 which is internally threaded for engagement upon the externally threaded upper end of the cut off valve 22.

With the pipe C and valve 22 in position within the tank, the float valve D is placed in position with the tapered lower end 24 of the pipe 25 disposed within the recess 23 in the cut off valve 22, after which the union 27 is screwed onto the valve 22. This will result in the proper positioning of the float valve structure D within the tank, as shown in the drawing. Assuming that the tank A is empty, opening the valve 22 will permit water to enter through the pipe C, valve 22, pipe 25, through the valve seat 8 and into the shell 5, whence it will pass through the pipe 11 and into the tank A. When the level of the water within the tank has risen to a considerable extent, the float 17 will be moved upwardly, rocking the arm 16 on its pivot 19 and moving the valve 10 downwardly into engagement with the seat 8. Water will then cease to flow into the tank but will remain therein until some suitable discharge valve, not shown, is opened. When such valve is opened the water within the tank will of course flow therefrom whereupon the float 17 and arm 16 will be moved downwardly causing the valve 10 to be elevated, permitting water to flow from the supply pipe into the pipe 11 to refill the tank. As water flows through the pipe 11, a certain portion thereof will pass through the small tube 12 and into the pipe B until the tank is nearly full, whereupon the raising of the lever 16 by the float 17 will cause the supply to be cut off by the lowering of the valve 10.

A very important feature of the invention is the connection of the pipe 25 with the valve structure 22 which permits the float valve and its associated parts to be bodily removed from the tank merely by unscrewing the union 27 from the valve structure 22.

From the foregoing description and a study of the drawing it will be apparent that I have thus provided a float valve which is extremely simple in construction, which eliminates the use of washers, which is not likely to get out of order and which efficiently performs all the functions for which it is intended.

Having thus described my invention I claim:—

In combination with a water inlet pipe, a pipe disposed in alinement with said inlet pipe and provided at its end adjacent thereto with a flange, a member communicating with said inlet pipe and secured upon one end thereof, a union engaging said flange and threaded upon said member, a shell, a plug threaded within the lower end of said shell and provided with an internally threaded bore communicating with a valve seat in the upper face of the plug, said last named pipe being threaded into said bore, and a float actuated valve movable within said shell and engageable with said seat.

In testimony whereof I affix my signature.

KENNETH L. BURRILL.